Dec. 30, 1958 J. L. HOELLERICH ET AL 2,866,904
RADIATION MEASURING APPARATUS
Filed Dec. 17, 1954 3 Sheets-Sheet 2
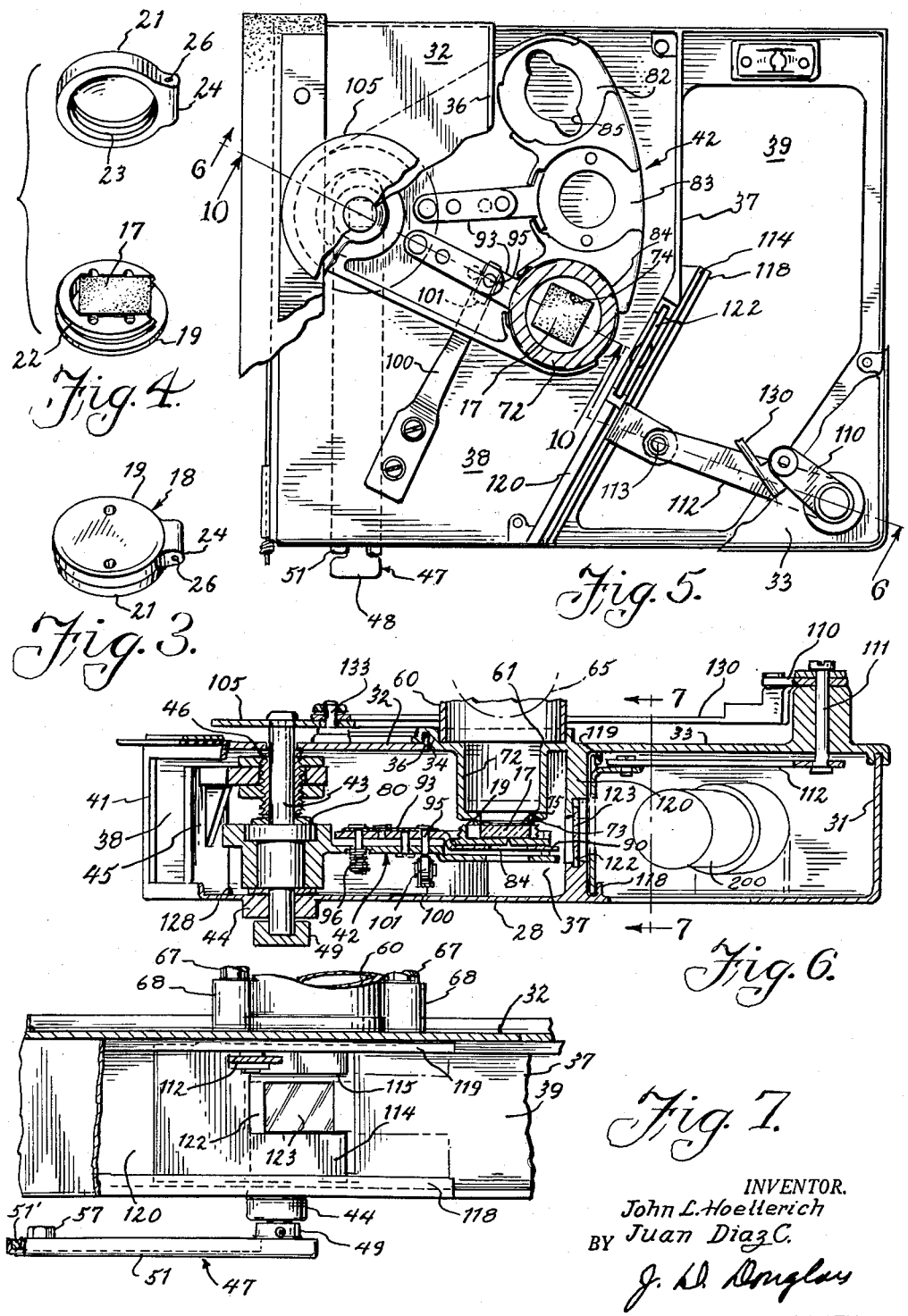
INVENTOR.
John L. Hoellerich
BY Juan Diaz C.
J. D. Douglas
ATTORNEY Dec. 30, 1958 J. L. HOELLERICH ET AL 2,866,904
RADIATION MEASURING APPARATUS
Filed Dec. 17, 1954 3 Sheets-Sheet 3
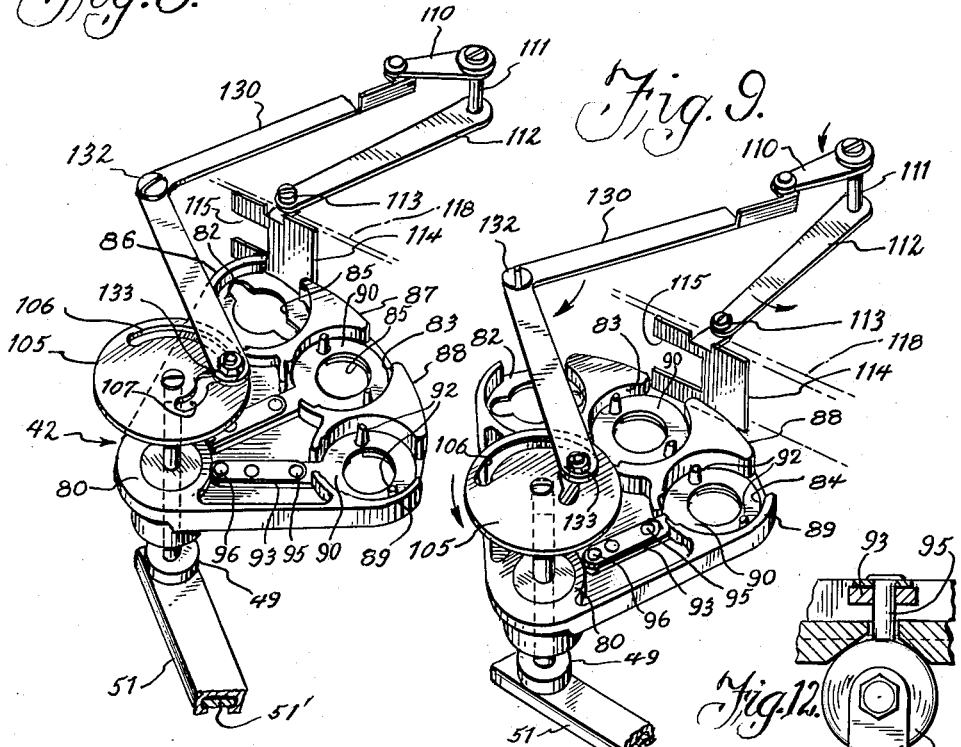
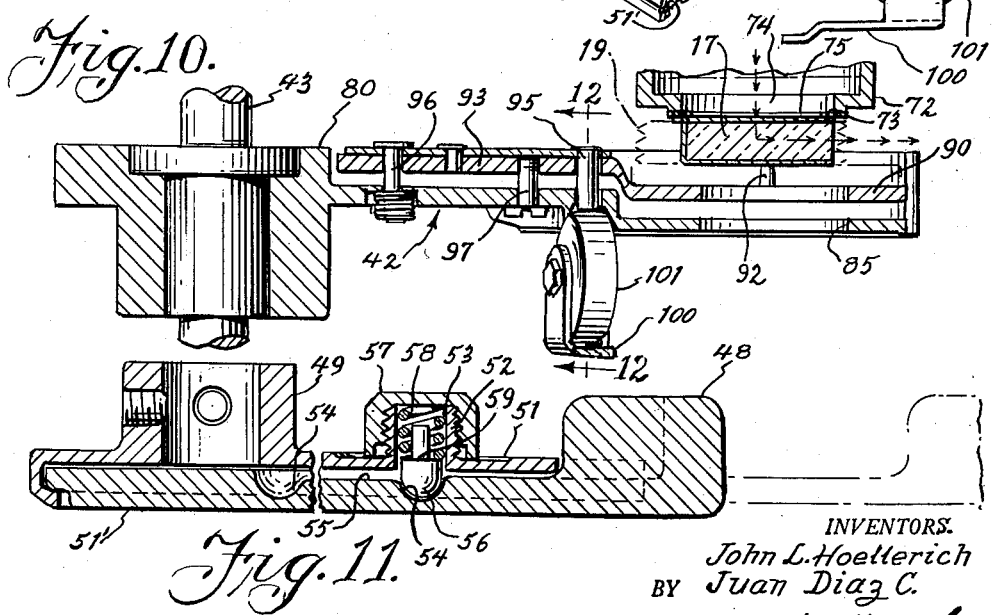
INVENTORS.
John L. Hoellerich
BY Juan Diaz C.
J. D. Douglas
ATTORNEY United States Patent Office 2,866,904
Patented Dec. 30, 1958

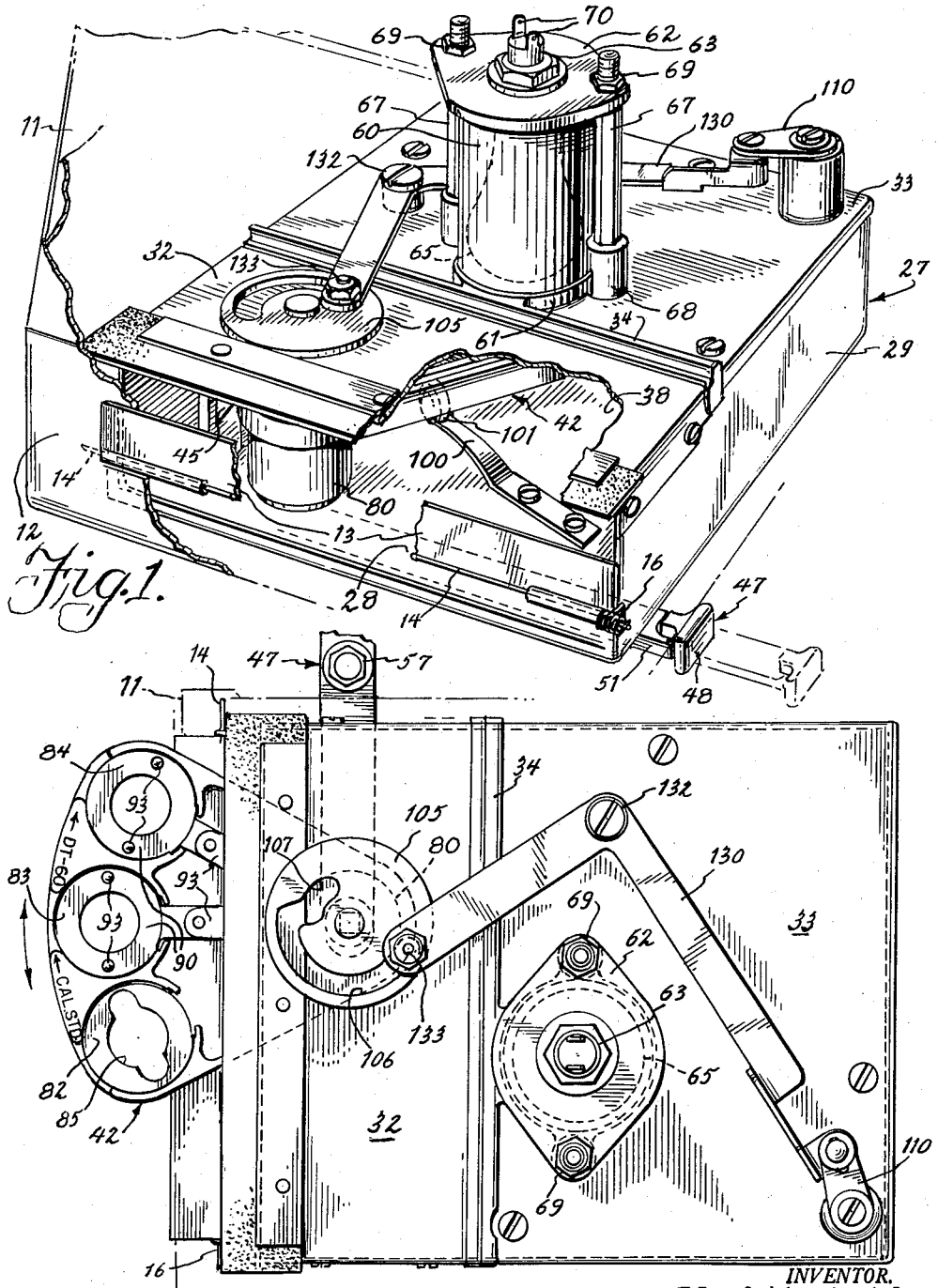

2,866,904

RADIATION MEASURING APPARATUS

John L. Hoellerich, Wilmette, and Juan Diaz C., Chicago, Ill., assignors to Admiral Corporation, Chicago, Ill., a corporation of Delaware Application December 17, 1954, Serial No. 476,046

19 Claims. (Cl. 250—71)

This invention relates to improvements in radiation measuring instruments and more particularly to an improvement in an apparatus for handling and presenting to a measuring device an article having radiophotoluminescence.

As is well known to those versed in the art, dosimeters have been provided wherein a silver-activated phosphor glass is subjected to light in the near ultra violet region and the radiophotoluminescence is measured by means of a reader sometimes called a fluorimeter which is a photoelectric measuring device utilizing a photomultiplier tube. The measurement of the luminescence of the dosimeter enables one to determine how much radiation the dosimeter has been subjected to.

In carrying out the measurement it is necessary to establish the accuracy of the dosimeter reader by certain calibration checks which include operating the instrument without any photoluminescence material in it, then operating it with a calibrating sample of known activity to provide a predetermined reading after which the dosimeter, which contains a glass the radiophotoluminescence of which is to be determined in Roentgen units, is measured. From the foregoing discussion it will be apparent that a device should be provided which excludes all extraneous light and that means must be provided to submit the calibrating standard, and, the dosimeter to be examined, quickly, easily and successively to the reader.

The present invention is, therefore, concerned with an apparatus which may be a part of a complete dosimeter reader where the calibrating standard and the dosimeter in question may be quickly and easily handled with a minimum of effort.

Generally the instrument comprises a casing which houses a meter, preferably calibrated in Roentgen units. The meter is operated by an electronic circuit which includes the photomultiplier tube and the necessary power supply and amplifier. The foregoing may take many different forms as is well known to those versed in the art. The photomultiplier tube is energized by light from the unit being measured and the unit being measured is energized by a source of near ultra violet light. The circuit per se comprises no part of the present invention which relates to handling the calibrating standard and the dosimeter under measurement so that they can be exposed to the light and in turn energize the photomultiplier or equivalent device.

In the drawings:

Fig. 1 is a fragmentary perspective view of apparatus embodying the invention, a portion thereof being broken away to reveal parts otherwise obscured, and showing in fragment a portion of the main casing in which the unit is assembled;

Fig. 2 is a top plan view of the apparatus, with certain parts in a loading position;

Fig. 3 is a bottom perspective view of a locket type dosimeter;

Fig. 4 is an exploded view of parts thereof, in perspective;

Fig. 5 is also a top plan view corresponding to Fig. 2 showing parts being broken away to show other parts in another position;

Fig. 6 is a vertical section taken on line 6—6 of Fig. 5;

Fig. 7 is a fragmentary vertical section taken on line 7—7 of Fig. 6;

Figs. 8 and 9 are perspective views showing the linkage for coordinating movement of the parts;

Fig. 10 is a fragmentary vertical section, drawn to an enlarged scale, taken on line 10—10 of Fig. 5;

Fig. 11 is an enlarged vertical medial sectional view of the operating handle, and Fig. 12 is a fragmentary section taken on line 12—12 of Fig. 10.

Throughout the drawings the reference character 11 is used to denote the main housing, in its entirety, of a dosimeter reader. It includes a vertical front wall 12 formed with a horizontal opening, which is normally closed by a spring loaded door 13. For this operation the door is arranged to pivot about an axis, at the lower edge thereof, provided by a horizontal rod 14 while a torsion spring 16, connected to the door, biases it to its closed relation to the opening.

Within the housing 11, at the opening, is mechanical apparatus for receiving and manipulating an irradiated body in such manner that it may condition the body to affect other apparatus not shown, supported by the casing, for determining the degree of irradiation of the body.

The dosimeter reader is particularly adapted for testing and measuring irradiation in a body of special construction. Such a body may take the form of a slug or small plate of silver-activated phosphor glass approximately $\frac{3}{4}''$ x $\frac{3}{4}''$ x $\frac{3}{16}''$ as indicated by the character 17 (Fig. 4). It is ordinarily contained within a locket 18 comprising a lower receptacle 19 and cover 21 therefor, the receptacle being externally threaded at 22 and the cover internally threaded at 23 for securing the parts to each other. The receptacle carries a lug 24, laterally thereof, which has therein an aperture 26 through which some medium such as a cord may be passed for securing the parts to a person's body. Such a device, in its entirety, is commonly referred to as a dosimeter or detector and may be worn by a person exposed to gamma or X-rays. Since radiation of this class is accumulative, in a slug of the foregoing description, the cover 21 of the dosimeter is occasionally removed and the slug 17 examined by means including the apparatus now to be described.

The novel apparatus comprises a sub-casing indicated in its entirety by the character 27 and includes a bottom wall 28 from which side walls 29 and a rear wall 31 extend upward to a front cover 32 and rear cover 33 bolted to the vertical walls, the composite cover structure facilitating disassembly of some of the parts without disturbance of assembly of other parts. To render the interior of the casing impervious to light at the junction between the front and rear covers, the rear cover 33 is formed with a channel 34 that defines a groove extending transversely thereof adjacent its forward edge in which is received a flange 36 struck upward from the rear edge of the front cover 32.

The interior of the casing is divided by a partition 37 to provide on one side thereof a test cell or compartment 38 and on the other side a relay cell 39.

The compartment 38 houses a pivoted slug carrier sector and/or skillet assembly 42. For its support, the carrier 42 is fixed to a vertical shaft 43 one end of which is journaled in a lower bearing 44, on the lower wall 28, and the other end of which is journaled in an upper bearing 46 in a bracket 45 supported by the bottom. To swing the carrier 42 about its axis, a telescopic sector handle 47 is secured on the lower end of the shaft 43 below the bearing 44. The outer end of handle 47 bears a grip 48 by which it may be swung between the positions indicated in Figs. 1 and 2.

As indicated, the distance that the grip 48 may be stationed from the shaft 42 is variable. To provide for this, the handle 47 is of composite structure. It includes a shaft boss 49, which may be secured to the shaft 43, and a handle arm 51 which is formed with a T-slot, Fig. 8, extending longitudinally thereof, in which the arm 51' is slidably received. Furthermore, the arm 51 is formed with an annular flange 52 about a bore 53, and the arm 51' is formed with spaced apart detents 54 at either end of a longitudinal groove 55. The flange 52 confines a follower 56 therein, assisted by a closed ended nut 57 threaded on the flange while a compression spring 58, confined between a shoulder 59 on the follower and the nut, biases said follower into engagement with the groove 55 so that as the handle is drawn outward to the limit of its extension, permitted by engagement of the follower with one end of the groove, said follower is pushed into the detent 54 nearest the end of arm 51 to releasably secure said arm in extended position. When the grip 48 is urged toward the shaft 43, the follower drops into the other detent 54 where it retains the handle in its retracted position. In its retracted position, the handle is shielded by the housing 11 since it is beneath said housing.

The handle is thus arranged to rotate the sector outward to a position outside the casing where the dosimeter and calibration standard may be loaded into the carrier and thus rotate into the casing where the standard and dosimeter may be selectively and successively swung into registration with the light source and the photomultiplier tube. At the same time a cam carried by the shaft 43 operates a linkage which opens and closes a shutter in the partition 37 opposite to the photomultiplier tube.

As is best shown in Figs. 1 and 6 a lamp housing is provided on the top wall 33 and is comprised simply by a tube 60 which seats in an annular seat 61 on the top wall. The upper end of the tube is closed by a removable plate 62 which carries a lamp socket 63 that supports a lamp 65 which emits light in the near ultra violet range, for example 3500 angstrom units. The plate 62 is held securely clamped in position by rods 67 which are threaded into bosses 68 in the wall 33 and extend through the cover 62 where they are held by nuts 69. Connections to energize the lamp are provided by lugs 70.

Underneath the wall 33 and below the tube 60 the wall is provided with a downwardly extending tube 72 which extends downward a predetermined distance and terminates at the end in an accurately machined surface 73 defining a square window 74 having a gasket 75 of rubber or like resilient material on the bottom.

This provides a light admitting window and allows the dosimeter or calibrated standard to be raised against it so that both receive the same amount of light successively. As can be seen, access to the light is easily realized for replacement purposes.

Means is provided, rotatable outside of the housing for the reception of the calibration standard and dosimeter, and which is rotatable into the housing to carry the standard and dosimeter into the housing in proper relation to the light source and photomultiplier tube. When the standard or dosimeter arrive at the proper position they are successively raised up to the window 74 and seated against the gasket 75.

The carrier or sector 42 is a sector-shaped member provided with a hub 80 secured to the shaft 43. The arcuate end of the sector is provided with upstanding flanges which define a series of three circular recesses 82, 83 and 84. These recesses are open at the top and are also provided with restricted openings outwardly of the edge of the skillet. Preferably openings 85 are provided through the bottom of the recesses, as best shown in Fig. 5. The recesses are defined by walls 86, 87, 88 and 89 of which the walls 86 and 89 provide a rib extending toward the hub. At this point it should be stated that although three such recesses are used it is within the purview of the invention that only two may be necessary in some instances. If two were used the sector could be smaller.

Seated in each of the recesses 83 and 84 are supporting members or skillets, Figs. 8 to 10 inclusive, each of which includes an outer ring portion 90 conforming to the shape of the recess, which is circular, and each of which may bear index or locator pins 92 extending upwardly on opposite sides. Extending inwardly toward the hub 80 from the rim, there is provided a stem 93 which is loosely secured to the body of the sector by a headed stud 95, the head of which extends below the sector and the end of which is staked into the stem. Near the end of the stem a similar stud 96 is provided secured in a similar manner except that a spring surrounds the stud between the head and the underside of the sector and the stem is thus held in spring pressed relation to the sector. A guide pin 97 adjacent the ring portion and staked into the stem extends through a guide aperture in the sector.

By the above structure it will be seen that the skillet member is movable upwardly relative to the support sector a limited distance. This enables the cell in the locket or the standard to be raised against the gasket seat 75 when that particular skillet is underneath the lamp housing.

Means is provided for effecting this raising and comprising a spring arm 100 secured to the bottom of the casing and bearing a roller 101 which is arranged to engage the stud 95 at the time that particular skillet is opposite the window in the lamp housing at which time the standard or detector is raised against the rubber gasket assuring that either will always be the same distance from the lamp and sealed against extraneous light. In this manner when the sector is rotated either the standard or the detector may be placed in position for receiving light rays.

As previously stated, the shaft 43 is rotated by the handle 51 which swings the sector. This shaft 43 extends through the upper cover and bears a cam disc 105 which is rotated along with the shaft. The cam disc has a slot therein, which, as can best be seen in Fig. 2, comprises an arcuate portion 106 one end of which extends inwardly at 107 and at an angle to the axes. A shutter control lever is provided and includes a short lever 110 secured to a shaft 111 and extending through the rear cover plate into the compartment 39. The other end of the shaft carries an arm 112. The arm 112 is pivotally secured at 113 to the shutter 114.

The shutter 114 is made of thin metal and of generally rectangular formation, being provided with a window 115 opening through one edge. The upper and lower edges of the shutter engage and slide in tracks 118 on the bottom wall and 119 on the top wall adjacent the partition 120 which is an angular continuation of the partition 37. This partition is provided with a window 122 which may support an orange glass filter 123.

The lever 110 is connected by a bell crank 130 pivoted at 132 to the top of the casing 33 the other end of the crank carrying a cam engaging stud or follower 133 which is engaged in the slot in the cam.

In its normal position, shown in Fig. 8, the recess 82 which is empty will be opposite to the window 122. At this time the follower 133 on the crank 130 is disposed in the circular portion of the cam track and the lever 110 is rotated to its extreme position clockwise along with the arm 112 to slide the shutter 114 in the track so that the window is closed by the body of the shutter and the opening in the shutter is beyond the window.

This is the position taken by the shutter where no light is admitted to the photomultiplier tube 200 in the chamber 39 and at this time the indicator may be adjusted for null response. It will also be noted that at this time the sector is inside the casing. From this position, because of the arcuate slot, the sector can be moved out of the casing as shown in Fig. 2 without effecting the shutter since the follower 133 slides in the slot 106. As the sector is moved out of the casing the edge of the sector engages the door 18 and opens it against the pressure of the spring 16. In its outward position the standard can be inserted in the recess 83 on the holder and the locket, the cover of which has been removed, can be disposed on the holder in the recess 84.

The standard and the locket having been installed, the handle is swung to move the sector inside of the housing. As soon as the sector passes beyond the door it automatically closes providing a substantially light-tight condition. The spring 100 with its roller 101 serves as a detent which determines the three positions for the three sockets when they are opposite the window as well as raising the holders. As stated, the sector is rotated until it reaches the position in Fig. 8, where the blank socket is opposite the window. At this time the follower on the bell crank 133 has reached the end of the arcuate slot. The indicator is then nulled at this point. Next the handle is again swung to bring the next succeeding socket containing the standard opposite to the window. At this time the follower 133 engages in the angular portion 107 of the cam slot which rotates the bell crank 130 and, in the manner described, moves the shutter 114 so that its opening coincides with that of the window 122. This alignment occurs as the recess 83 is opposite to the window and the spring 100 with its roller 101 engages the stud 95 raising the standard up against the gasket 75. This seats the standard against the seat and the light from the lamp causes a photoluminescence to be generated in the standard which is directed outward through the window against the opening in the photomultiplier tube 200 which causes a reading on the meter. Since the standard has a known amount of photoluminescence indicative of a certain number of Roentgen units, the other high end of the meter reading can be calibrated. The meter now having been calibrated for both ends the handle is moved once more to bring the dosimeter locket opposite to the window at which time it is also automatically pushed up against the seat 75 and a direct reading of the photoluminescence in terms of Roentgen units be made.

It will thus be seen that a reader unit is provided where errors in readings due to the human element in placement or judgement is completely eliminated. It is also apparent that the reading is exact because of the manner of raising the dosimeter into contact with the window for the light source and that the operations may be carried out by persons with a minimum of mechanical skill.

It will be noted, as can best be seen in Figs. 1 and 2, that the sector handle in the innermost position where the dosimeter is next to the window is disposed under the casing, and that when it is rotated to a loading position it is rotated around the front of the casing and over to the other side. Because of the telescoping nature of the sector handle this provides a convenient position for it to assume with the handle in the telescoped position for normal storage wherein the handle is out of the way and the front of the apparatus is enclosed by a cover, not shown.

Having thus described our invention we are aware that numerous and extensive departures may be made therefrom without departing from the spirit of the invention as defined in the appended claims.

We claim:

1. An apparatus for moving a radiophotoluminescent article into juxtaposition with an illumination source and means for measuring the luminescence thereof upon being subjected to said illuminating source comprising a casing having an opening at one side thereof, a partition dividing said casing into two compartments, a housing supported on said casing and formed with an opening adjacent said partition, an opening in said partition, shutter means for closing and opening said opening, swingable means for supporting said radiophotoluminescent article and a calibration standard pivotally supported from the walls of said casing adjacent to the opening in said casing, operating means connected to said supporting means for rotating it from a position within the casing to a position exteriorly of the casing, said supporting means being provided with a plurality of recesses therein, support means movably supported in each of said recesses, said recesses being disposed in an arcuate line concentric with the axis for said supporting means and selectively movable to a position opposite to said illuminating means.

2. An apparatus for moving a radiophotoluminescent article into juxtaposition with an illumination source and means for measuring the luminescence thereof upon being subjected to said illuminating source comprising a casing having an opening at one side thereof, a partition dividing said casing into two compartments, a light housing supported on said casing and formed with an opening communicating with an opening in said casing adjacent said partition, a seat surrounding said opening, an opening in said partition, shutter means for closing and opening said opening, swingable means for supporting said radiophotoluminescent article and a calibration standard, pivotally supported from the walls of said casing adjacent to the side opening in said casing, operating means connected to said supporting means for rotating it from a position within the casing to a position exteriorly of the casing, said supporting means being provided with a plurality of recesses therein, support means for said radiophotoluminescent article movably supported in each of said recesses and movable toward said seat, said recesses being disposed in an arcuate line concentric with the axis for said supporting means and selectively movable to a position opposite to said illuminating means, and means for engagement with said movable support means to move said radiophotoluminescent article against said seat.

3. An apparatus for moving a radiophotoluminescent article into juxtaposition with an illumination source and means for measuring the luminescence thereof upon being subjected to said illuminating source comprising a casing having an opening at one side, a partition dividing said casing into two compartments, a housing supported on said casing and formed with an opening through said casing adjacent said partition, an opening in said partition and shutter means for closing and opening said opening, means for supporting said radiophotoluminescent article and a calibration standard comprising a sector pivotally supported from the walls of said casing adjacent to said opening, operating means connected to said sector for rotating it from a position within the casing to a position exteriorly of the casing, said sector being provided with a plurality of sockets therein, support means movably supported in said sockets, said sockets being disposed on an arcuate line concentric with the axis for said sector and selectively movable to a position opposite to said illuminating means, means on said support means projecting through said sector and spring pressed means under said sector for engaging said last mentioned means to displace said support means and move it upwardly when each support means is disposed opposite said illuminating means, said support means arranged to carry said radiophotoluminescent means and said calibrated standard.

4. An apparatus for moving a radiophotoluminescent article into juxtaposition with an illumination source and means for measuring the luminescence thereof upon being subjected to said illuminating source comprising a casing having an opening at one side, a partition dividing said casing into two compartments, a housing supported on said casing and formed with an opening through said casing adjacent said partition, an opening in said partition and shutter means for closing and opening said opening, means for supporting said radiophotoluminescent article and a calibration standard comprising a sector pivotally supported from the walls of said casing adjacent to said opening, operating means connected to said sector for rotating it from a position within the casing to a position exteriorly of the casing, said sector being provided with a plurality of sockets therein, support means movably supported in said sockets, said sockets being disposed on an arcuate line concentric with the axis for said sector and selectively movable to a position opposite to said illuminating means, means on said support means projecting through said sector and spring pressed means under said sector for engaging said last mentioned means to displace said support means and move it upwardly when each support means is disposed opposite said illuminating means, said support means arranged to carry said radiophotoluminescent means and said calibrated standard, cam means connected to said sector and movable therewith and means operated by said cam means connected to said shutter for opening said shutter when a support means is opposite said illuminating means.

5. An apparatus for moving a radiophotoluminescent article into juxtaposition with an illumination source and means for measuring the luminescence thereof upon being subjected to said illuminating source comprising a casing, said casing having an opening at one side thereof, a partition dividing said casing into two compartments, a housing supported on said casing and formed with an opening adjacent said partition, an opening in said partition and shutter means for closing and opening said opening, means for supporting said radiophotoluminescent article and a calibration standard comprising a sector pivotally supported from the walls of said casing adjacent to an opening of said casing, operating means connected to said sector for rotating it from a position within the casing to a position exteriorly of the casing, said sector being provided with a plurality of sockets therein, support means movably supported in said sockets, said sockets being disposed on an arcuate line concentric with the axis for said sector and selectively movable to a position opposite to said illuminating means, means on said support means projecting through said sector and spring pressed means under said sector for engaging said last mentioned means to displace said support means and move it upwardly when each support means is disposed opposite said illuminating means said support means arranged to carry said radiophotoluminescent means and said calibrated standard, a closure for said opening resiliently biased to close said opening and positioned for engagement by said sector and to be opened by said sector when said sector is rotated out of said casing.

6. An apparatus for moving a radiophotoluminescent article into juxtaposition with an illumination source and means for measuring the luminescence thereof upon being subjected to said illuminating source comprising a casing, said casing having an opening at one side thereof, a partition dividing said casing into two compartments, a housing supported on said casing and formed with an opening adjacent said partition, an opening in said partition and shutter means for closing and opening said opening, means for supporting said radiophotoluminescent article and a calibration standard comprising a sector pivotally supported from the walls of said casing adjacent to an opening of said casing, operating means connected to said sector for rotating it from a position within the casing to a position exteriorly of the casing, said sector being provided with a plurality of sockets therein, support means movably supported in said sockets, said sockets being disposed on an arcuate line concentric with the axis for said sector and selectively movable to a position opposite to said illuminating means, means on said support means projecting through said sector and spring pressed means under said sector for engaging said last mentioned means to displace said support means and move it upwardly when each support means is disposed opposite said illuminating means said support means arranged to carry said radiophotoluminescent means and said calibrated standard, cam means connected to said sector and movable therewith and means operated by said cam means connected to said shutter for opening said shutter when a support means is opposite said illuminating means, a closure for said opening resiliently biased to close said opening and positioned for engagement by said sector and to be opened by said sector when said sector is rotated out of said casing.

7. Apparatus for determining irradiation in a slug comprising a casing having a partition dividing the same into adjacent test and relay cells said partition being formed with an aperture therein and said casing being formed with an opening in the walls of said test cell remote from said aperture, a movable slug carrier in the test cell, a slug socket on the carrier, a door biased to close the opening and arranged to be engaged and opened by pressure exerted thereon by the carrier when it is moved outward for the socket to be carried through the opening to a loading point externally thereof to receive an irradiated slug and to then carry it to a test position adjacent the aperture, conditioning means on the casing and capable of acting on the slug when it is adjacent its test position, and relay apparatus within the relay cell capable of operating indicating apparatus when exposed to the conditioned slug when the condition thereof is communicated to the apparatus through the aperture.

8. Apparatus for determining the degree of irradiation in a slug comprising opaque means providing adjoining test and relay cells having a wall separating them and having an aperture in said wall and an opening in the wall of said test cell remote from said aperture, a slug carrier pivotally disposed in the test cell, a slug socket on the carrier, a door for said opening biased to a closed position and arranged to be opened by the carrier when it is swung about its axis to move outward and carry the socket through the opening to a loading position externally thereof to receive an irradiated slug and to then carry said slug to a test position adjacent the aperture, means on the opaque means capable of producing luminescence in said slug when it is in its test position, and luminescence sensitive relay means within the relay cell, said luminescence being to a degree dependent on the extent of the irradiation and affecting the relay means through the aperture thereby for said relay means to operate indicating apparatus.

9. Apparatus to measure irradiation of a slug comprising opaque means providing walls defining adjoining test and relay cells separately by a partition and having an aperture therein and an opening in the walls of said test cell remote from said aperture, a slug carrier movably mounted in the test cell, a slug socket on the carrier, a door biased to close the opening and arranged to be opened by pressure thereon exerted by the carrier when it is moved outward to carry the socket through the opening to a loading point externally thereof for receiving an irradiated slug and then to move inward to carry said slug to a test position adjacent the aperture, means on the casing capable of producing luminescence in said slug when it is in its test position, luminescence sensitive relay means within the test cell, said luminescence being to a degree dependent on the irradiation and the relay being responsive to the degree of luminescence for operating measurement indicating apparatus, said relay being operated through the aperture, an aperture closing shutter element associated with the aperture, and a linkage interconnecting said element and said carrier whereby movement of the carrier closes the aperture and excludes light from the exterior of the casing from the relay means when the door is open and inward motion of said carrier opens the shutter.

10. Apparatus to measure irradiation of a slug comprising a casing providing adjoining test and relay cells separated by a partition having an aperture therein and an opening in the walls of said test cell remote from said aperture, a slug carrier movably mounted in the test cell, a slug socket on the carrier, a door biased to close the opening but arranged to be opened by pressure thereon exerted by the carrier when it is moved outward to carry the socket through the opening to a loading point externally thereof for receiving an irradiated slug and then to move inward to carry said slug to a test position adjacent the aperture, means on the casing capable of producing luminescence in said slug when it is in its test position, luminescence sensitive relay means within the relay cell, said luminescence being to a degree dependent on the extent of the irradiation and affecting the relay means through the aperture thereby for said relay means to operate measuring apparatus, an aperture closable element movably associated with the aperture, and linkage including a cam connected to the carrier for movement thereby and coupled to the element for closing the aperture prior to opening of the door as the carrier is moved outward and for opening said aperture subsequent to closing of the door and prior to transfer of the slug to its test position during inward movement of said carrier thereby to protect the luminescence sensitive relay from light externally of the casing.

11. In apparatus for measuring irradiation of a slug, a socket carrier arranged to move between test and loading positions, a slug socket biased into seated relation to the carrier, means providing an enclosure having an opening adjacent the test position, a test seat about the opening, a pair of operating members, one of said members being connected to the socket and the other in fixed relation to the seat, one of the members being arranged to cooperate with the other member by a camming operation when the socket is carried to its test position to unseat the socket from the carrier and move it and displace the slug into seated relation with the test seat, and conditioning means within the enclosure for conditioning the slug through the opening when seated thereat to a degree dependent on the degree of its irradiation for said slug to operate measuring apparatus.

12. In irradiation measuring apparatus, a socket carrier pivoted to swing between test and loading positions, a slug socket biased into seated relation to the carrier, means providing a cell having an opening adjacent the test position, a test seat about the opening, a spring supported member, a contactor member, one of the members being rigidly coupled to the socket and the other of said members being mounted in fixed relation to said means and being arranged to cooperate with said one member when the socket is carried to its test position, said cooperation involving a camming action to unseat the socket from the carrier and move it therefrom and resiliently urge an irradiated slug carried by said socket into seated relation to the test seat, and conditioning means in the cell capable of conditioning the slug through said opening to a degree dependent on the degree of the irradiation for the condition of said slug to operate electrical measuring apparatus.

13. In irradiation measuring apparatus, a socket carrier mounted to move between test and loading positions, a slug socket biased into seated relation to the carrier, means providing a cell having an aperture adjacent the test position, a test seat about the opening, a spring supported in fixed relation to said means, antifriction means carried by the spring, a contactor in fixed relation to the socket and engagingly cooperable with said antifriction means when the socket is carried to its test position whereby said socket is unseated from said carrier by force of the spring to carry an irradiated slug into seated engagement with the test seat, a pair of centering members, one of said members being fixed on either side of the contactor for concurrent engagement by said antifriction means for releasably securing said carrier against movement away from the position in which the slug is in seated relation to the test seat by balancing lateral components of force created by the spring and exerted on the carrier by said antifriction means, and conditioning means in the cell operable through the opening to create luminescence in said slug to a degree dependent on its degree of irradiation, the luminescence being capable of operating measuring apparatus.

14. In irradiation measuring apparatus a socket carrier pivoted to be swung between test and loading positions, a slug socket biased into seated relation to the carrier, means providing a light excluding cell having an aperture adjacent the test position, a slug seat about the aperture, a pair of cams providing a notch on the carrier, a spring supported in fixed relation to the cell, a follower supported by said spring and thereby biased into engagement with the carrier and pressed into the notch when said socket is carried to its test position for releasably securing said carrier therein, a contactor in fixed relation to the socket and extending into the notch for displacement by the follower when said carrier is releasably secured thereby to unseat the socket and move an irradiated slug carried by said socket into seated engagement with the slug seat, and a source of ultra violet light in the cell capable of creating luminescence of the slug through the aperture to a degree dependent on the degree of irradiation of said slug when it is seated so that the luminescence of said slug may operate photoelectronic apparatus for measuring its irradiation.

15. In irradiation measuring apparatus, a socket carrier, a plurality of slug sockets biased into seated relation to the carrier, said carrier being arranged to be moved manually from a loading position to carry a selected one of the sockets to a test position, means providing a light excluding cell having an aperture adjacent the test position, a slug seat about the aperture, pairs of cams arranged to provide notches on the carrier, one of the notches being in association with each of the sockets, a spring supported in fixed relation to the cell, a follower carried by the spring, said spring biasing said follower into pressure engagement with said carrier and being arranged to releasably secure a selected socket in the test position by pressing the follower into the notch associated with said selected socket as said carrier is operatively moved, a contactor on each of the sockets extending into an adjacent notch for alternate displacement by the follower thereby for a selected follower to be unseated as it is carried to its test position to move an irradiated slug carried thereby into seated relation to the test seat, and a source of ultra violet light in the cell capable of creating luminescence in the seated slug on passing of the light through the opening, said luminescence being to a degree dependent on the degree of irradiation of the slug so that said luminescence may operate photo-electronic measuring apparatus whereby the irradiation of the selected slug may be measured.

16. In irradiation measuring apparatus, a socket carrier, a plurality of slug sockets biased into seated relation to one side of the carrier, said carrier being arranged to be swung manually about a vertical axis from a loading position to carry a selected one of the sockets to a test position, means providing a light excluding cell having an aperture adjacent the test position, a slug seat about the aperture, pairs of cams arranged to provide notches on the other side of the carrier, one of the notches being in association with each of the sockets, a spring supported in fixed relation to the cell, a follower carried by the spring, said spring biasing said follower into pressure engagement with said carrier and being arranged to releasably secure a selected socket in the test position by pressing the follower into the notch associated with said selected socket notch as said carrier is operatively moved, a contactor on each of the sockets extending into the notches for alternate displacement by the follower thereby for a selected socket to be unseated when it is in test position, anchor means for each of the sockets to floatingly secure them to the carrier by limiting their movement therefrom and permitting them to tip when so moved thereby for the unseated socket to carry an irradiated slug into seated relation to the slug seat, and a source of ultra violet light in the cell capable of creating luminescence in the seated slug on passing of the light through the opening, said luminescence being to a degree dependent on the degree of irradiation of the slug so that said luminescence may operate photo-electronic measuring apparatus whereby the irradiation of the selected slug may be measured.

17. Apparatus for measuring irradiation of a slug comprising means providing a test cell having an opening at one side thereof, a movable socket carrier, a slug socket releasably seated on the carrier, a door biased to normally close the opening but arranged to be opened by pressure engagement by the carrier for said socket to be carried to a loading position externally of the opening and therefrom to a test position within the cell, a pair of socket unseating members, one of said members being connected to the first named means and the other member connected to the socket, said members cooperating by a camming action as the socket is carried to its test position thereby to unseat the socket and cause displacement of an irradiated slug therein for its intimate relationship with means associated with the cell for conditioning said slug to operate photo-electronic measuring apparatus also associated with the cell for indicating the degree of irradiation of said slug, a linkage coupled to the carrier and extending externally of the cell and a handle externally of the cell on the linkage, said linkage being extensible for moving of said carrier between its position by the handle and being contractile for the handle to be moved to a position shielded by said first named means when the apparatus is not in use.

18. In apparatus for determining irradiation of a slug, a casing providing a compartment having an opening laterally thereof, a shaft journaled in the casing adjacent the opening and extending externally of said casing, a socket carrier carried by the shaft, a door biased to normally close the opening but arranged to be opened by pressure engagement by the carrier for said socket to be carried to a loading position externally of the casing and therefrom to a test position within the compartment, a pair of socket unseating members, one of the members being connected to the socket and the other member supported by the casing and arranged to cooperate with said one member by a camming action as the socket is carried to its test position thereby unseating said socket from said carrier for moving an irradiated slug carried by the socket into operative relation to means for producing luminescence in said slug dependent on the degree to which it is irradiated for the luminescence to be recorded by photo-electronic measuring apparatus whereby the irradiation is determined, and a crank arm fixed to the shaft, said arm being extensile to swing the carrier between its positions and being contractile for it to be shielded by the casing when the apparatus is not in use.

19. In apparatus for determining irradiation of a slug, a casing providing a compartment having an opening laterally thereof, a shaft journaled in the casing and extending externally thereof, a socket carrier carried by the shaft, a door biased to normally close the opening but arranged to be opened by pressure engagement by the carrier when the shaft is turned for said socket to be carried to a loading position externally of the casing and therefrom to a test position within the compartment, a pair of socket unseating members, one of the members being connected to the socket and the other member supported by the casing and arranged to cooperate with said one member by a camming action as the socket is carried to its test position thereby unseating said socket from said carrier for moving an irradiated slug carried by the socket into operative relation to means for producing luminescence in said slug dependent on the degree to which it is irradiated for the luminescence to be recorded by photoelectronic measuring apparatus whereby the irradiation is determined, a crank element fixed to the shaft, an extension element carried by the crank, a handle carried by the extension element, coupling means on one of the elements couplingly engaging the other element to provide longitudinal movement of the extension element relative to the crank to vary the position of the handle relative to the shaft and thereby provide a fully extended position for said handle for swinging the carrier between its two positions and a contracted position wherein the handle may be positioned when the foregoing apparatus is not in use, and a retention member including a spring pressed member carried by one of the elements, a pair of sockets on the other element to releasably receive the spring pressed member whereby said handle may be alternately in its extended or retracted relation to said crank member.

References Cited in the file of this patent

UNITED STATES PATENTS

| | | |
|---|---|---|
| 2,478,745 | Cornwall | Aug. 9, 1949 |
| 2,490,298 | Ghiorso et al. | Dec. 6, 1949 |
| 2,620,445 | Tyler | Dec. 2, 1952 |